US012651796B2

(12) United States Patent
Miyawaki et al.

(10) Patent No.: US 12,651,796 B2
(45) Date of Patent: Jun. 9, 2026

(54) POWER STORAGE APPARATUS

(71) Applicant: GS Yuasa International Ltd., Kyoto (JP)

(72) Inventors: Yasutaka Miyawaki, Kyoto (JP); Yoshihiro Nakamura, Hiroshima (JP); Yoshiki Karata, Hiroshima (JP)

(73) Assignee: GS Yuasa International Ltd., Kyoto (JP)

( * ) Notice: Subject to any disclaimer, the term of this patent is extended or adjusted under 35 U.S.C. 154(b) by 668 days.

(21) Appl. No.: 17/636,619

(22) PCT Filed: Sep. 3, 2020

(86) PCT No.: PCT/JP2020/033495
§ 371 (c)(1),
(2) Date: Feb. 18, 2022

(87) PCT Pub. No.: WO2021/045170
PCT Pub. Date: Mar. 11, 2021

(65) Prior Publication Data
US 2022/0285776 A1　Sep. 8, 2022

(30) Foreign Application Priority Data
Sep. 5, 2019　(JP) ................................. 2019-162052

(51) Int. Cl.
*H01M 50/258*　(2021.01)
*H01M 50/209*　(2021.01)
(Continued)

(52) U.S. Cl.
CPC ....... *H01M 50/258* (2021.01); *H01M 50/209* (2021.01); *H01M 50/262* (2021.01); *H01M 50/264* (2021.01); *H01M 50/271* (2021.01)

(58) Field of Classification Search
CPC ............. H01M 50/258; H01M 50/262; H01M 50/264; H01M 50/209
See application file for complete search history.

(56) References Cited

U.S. PATENT DOCUMENTS

2006/0251946 A1　11/2006　Makuta et al.
2008/0280194 A1*　11/2008　Okada ................. H01M 50/264
429/99
(Continued)

FOREIGN PATENT DOCUMENTS

JP　　2006-331805 A　12/2006
JP　　2007-311173 A　11/2007
(Continued)

OTHER PUBLICATIONS

Machine Translation of WO2018/235557A1. (Year: 2018).*
(Continued)

*Primary Examiner* — Jonathan G Jelsma
(74) *Attorney, Agent, or Firm* — McGinn IP Law Group, PLLC

(57) ABSTRACT

A power storage apparatus includes: a first end component and a second end component that interpose power storage devices in a first direction; and a first side component and a second side component that interpose the power storage devices in a second direction. The first end component includes a first end connector connected to the first side component and a second end connector connected to the second side component. The first side component includes a first side connector connected to the first end connector. The second side component includes a second side connector connected to the second end connector. The first end connector and the first side connector overlap one another in the
(Continued)

first direction, and are joined. The second end connector and the second side connector overlap one another in the second direction, and are joined.

20 Claims, 6 Drawing Sheets

(51) Int. Cl.

| | |
|---|---|
| *H01M 50/262* | (2021.01) |
| *H01M 50/264* | (2021.01) |
| *H01M 50/271* | (2021.01) |

(56)          References Cited

U.S. PATENT DOCUMENTS

| | | | |
|---|---|---|---|
| 2012/0003526 A1* | 1/2012 | Kume | H01M 10/0481 |
| | | | 429/151 |
| 2012/0115004 A1* | 5/2012 | Park | H01M 50/209 |
| | | | 429/120 |
| 2012/0214046 A1 | 8/2012 | Lim | |
| 2013/0052514 A1* | 2/2013 | Kim | H01M 50/507 |
| | | | 429/179 |
| 2016/0260947 A1 | 9/2016 | Amagai | |
| 2017/0352850 A1* | 12/2017 | Nagane | H01M 50/236 |
| 2018/0138473 A1 | 5/2018 | Bessho et al. | |
| 2019/0013500 A1 | 1/2019 | Sakurai | |
| 2019/0326569 A1 | 10/2019 | Chi et al. | |
| 2019/0348728 A1* | 11/2019 | Kawata | H01M 50/209 |

FOREIGN PATENT DOCUMENTS

| | | | | |
|---|---|---|---|---|
| JP | 2011-228165 | A | 11/2011 | |
| JP | 2012-160347 | A | 8/2012 | |
| JP | 2012-164545 | A | 8/2012 | |
| JP | 2012-174693 | A | 9/2012 | |
| JP | 2012-256466 | A | 12/2012 | |
| JP | 2013-122819 | A | 6/2013 | |
| JP | 2015-185415 | A | 10/2015 | |
| JP | 2017-123336 | A | 7/2017 | |
| JP | 2017-216095 | A | 12/2017 | |
| JP | 2019-016502 | A | 1/2019 | |
| JP | 2020-140762 | A | 9/2020 | |
| KR | 10-2018-0113906 | A | 10/2018 | |
| WO | WO2015/079496 | A1 | 6/2015 | |
| WO | WO-2017064969 | A1 * | 4/2017 | H01M 50/209 |
| WO | WO-2018235557 | A1 * | 12/2018 | H01M 50/209 |

OTHER PUBLICATIONS

International Search Report (ISR) (PCT Form PCT/ISA/210, in PCT/JP2020/033495, dated Nov. 10, 2020.
Extended European Search Report issued Sep. 30, 2022 for European Patent Application No. 20860037.9-1202.

* cited by examiner

10

610

710

700

600

VI

610

300,
302

400,
402

400a 400, 401

500

300, 301

400a

Z

Y

X

10

710

700

610

600

610

600

500

400, 402

400a 300, 302

400a

200

100

200

400a 400, 401

300, 301

200

Z

Y

X

POWER STORAGE APPARATUS

TECHNICAL FIELD

The present disclosure relates to a power storage apparatus including power storage devices.

BACKGROUND ART

Conventional power storage apparatuses that include power storage devices, end components disposed at positions interposing the power storage devices, and side components connected to the end components are widely known. Patent Literature (PTL) 1 discloses a battery system (a power storage apparatus) that includes battery cells (power storage devices), end plates (end components) that fix the battery cells by applying pressure in the stacking direction, and binders (side components) coupled to the end plates.

CITATION LIST

Patent Literature

[PTL 1] Japanese Unexamined Patent Application Publication No. 2015-185415

SUMMARY OF INVENTION

Technical Problem

The conventional power storage apparatus having the above configuration has a problem that the binding force applied to the power storage devices may be unbalanced.

An object of the present disclosure is to provide a power storage apparatus capable of inhibiting unbalance in the binding force applied to the power storage devices.

Solution to Problem

A power storage apparatus according to an aspect of the present disclosure includes: power storage devices arranged in a first direction; a first end component and a second end component disposed in positions interposing the power storage devices in the first direction; and a first side component and a second side component disposed in positions interposing the power storage devices in a second direction intersecting the first direction. The first end component includes a first end connector connected to the first side component and a second end connector connected to the second side component. The first side component includes a first side connector connected to the first end connector. The second side component includes a second side connector connected to the second end connector. The first end connector and the first side connector overlap one another in the first direction, and are joined. The second end connector and the second side connector overlap one another in the second direction, and are joined.

The present disclosure can be implemented not only as the power storage apparatus described above, but also as the end components and the side components included in the power storage apparatus.

Advantageous Effects of Invention

The power storage apparatus according to the present disclosure is capable of inhibiting unbalance in the binding force applied to the power storage devices.

DESCRIPTION OF EMBODIMENT

Figure 1:
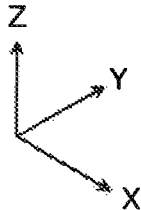
FIG. 1 is a perspective view illustrating an external appearance of a power storage apparatus according to an embodiment.

The conventional power storage apparatus having the above configuration has a problem that the binding force applied to the power storage devices may be unbalanced. In PTL 1, the end components and the side components overlap one another and are coupled in the arrangement direction of the power storage devices. The inventors of the present application have found that in such a configuration, the binding force concentrates on both end portions of the power storage devices on the side-component sides, and such concentration of the binding force may create unbalance in the binding force applied to the power storage devices.

The present disclosure has been conceived to solve the above problem, and has an object to provide a power storage apparatus capable of inhibiting unbalance in the binding force applied to the power storage devices.

In order to achieve the above object, a power storage apparatus according to an aspect of the present disclosure includes: power storage devices arranged in a first direction; a first end component and a second end component disposed in positions interposing the power storage devices in the first direction; and a first side component and a second side component disposed in positions interposing the power storage devices in a second direction intersecting the first direction. The first end component includes a first end connector connected to the first side component and a second end connector connected to the second side component. The first side component includes a first side connector connected to the first end connector. The second side component includes a second side connector connected to the second end connector. The first end connector and the first side connector overlap one another in the first direction, and are joined. The second end connector and the second side connector overlap one another in the second direction, and are joined.

According to this, in the power storage apparatus, the first end connector of the first end component and the first side connector of the first side component overlap one another in the first direction and are joined, and the second end connector of the first end component and the second side connector of the second side component overlap one another in the second direction and are joined. By joining the first end component and the first side component in the first direction and joining the first end component and the second side component in the second direction in the above-described manner, the first end component is joined in different directions, i.e., the first direction and the second direction. Accordingly, since it is possible to inhibit concentration of the binding force at both end portions of the power storage devices on the side-component sides while binding the power storage devices in the first direction, unbalance in the binding force applied to the power storage devices can be inhibited.

The second end component may include a third end connector connected to the second side component. The second side component may include a third side connector connected to the third end connector. The third end connector and the third side connector may overlap one another in the first direction and be joined.

According to this, in the power storage apparatus, the third end connector of the second end component and the third side connector of the second side component overlap one another in the first direction, and are joined. By joining the second end component and the second side component in the first direction in the above-described manner, the second side component joined to the first end component in the second direction can be joined to the second end component in the first direction. Accordingly, it is possible to inhibit unbalance of the binding force applied to the power storage devices while increasing the binding force applied to the power storage devices in the first direction.

The second end component may include a fourth end connector connected to the first side component. The first side component may include a fourth side connector connected to the fourth end connector. The fourth end connector and the fourth side connector may overlap one another in the second direction and be joined.

According to this, in the power storage apparatus, the fourth end connector of the second end component and the fourth side connector of the first side component overlap one another in the second direction, and are joined. By joining the second end component and the first side component in the second direction in the above-described manner, both of the two end components are joined to the two side components in different directions, i.e., the first direction and the second direction, and both of the two side components are joined to the two end components in the different directions. Accordingly, the power storage devices can be bound in a well-balanced manner by the two end components and the two side components, and thus, it is possible to inhibit unbalance of the binding force applied to the power storage devices.

The first end connector may include a recessed portion recessed in the first direction, and the first side connector may be disposed in the recessed portion and be joined to the first end connector.

According to this, the first side connector of the first side component is disposed in the recessed portion that belongs to the first end connector of the first end component and is recessed in the first direction, and the first side connector is joined to the first end connector. By disposing at least part of the first side connector in the recessed portion of the first end connector in the above-described manner when joining the first side connector to the first end connector, it is possible to inhibit the first side connector from protruding from the first end connector in the first direction. Accordingly, since it is possible to inhibit the first side component from protruding from the first end component in the first direction, unbalance of the binding force applied to the power storage devices can be inhibited while saving space.

The second end connector may be a side wall of the first end component in the second direction, and the second side connector may overlap the side wall in the second direction and be joined to the side wall.

According to this, the second side connector of the second side component overlaps the side wall of the first end component in the second direction, i.e., overlaps the second end connector in the second direction, and is joined to the side wall. Since the second side connector overlaps the side wall of the first end component in the second direction and is joined to the side wall in the above-described manner, it is possible to inhibit the second side connector from protruding from the first end component in the first direction. Accordingly, since it is possible to inhibit the second side component from protruding from the first end component in the first direction, unbalance of the binding force applied to the power storage devices can be inhibited while saving space.

Hereinafter, a power storage apparatus according to an embodiment of the present disclosure will be described with reference to the drawings. The embodiment described below shows a general or specific example. The numerical values, shapes, materials, structural elements, the arrangement and connection of the structural elements, fabricating steps, and the processing order of the fabricating steps etc. shown in the following embodiment are mere examples, and do not limit the present disclosure. Among the structural elements in the following embodiment, structural elements not recited in the independent claim representing the most generic concept will be described as optional structural elements. The dimensions etc. shown in the drawings are not necessarily precise.

In the following description and the drawings, the arrangement direction of a pair of electrode terminals of a power storage device, the direction in which a pair of short side surfaces of a container of a power storage device face each other, the arrangement direction of a pair of side components, or the arrangement direction of the power storage devices and the side components is defined as the direction of the X axis. The arrangement direction of the power storage devices, the arrangement direction of spacers, the arrangement direction of a pair of end components, the arrangement direction of the power storage devices, the spacers, and the end components, the direction in which a pair of long side surfaces of the container of a power storage device face each other, or the thickness direction of the power storage devices, the spacers, or the end components is defined as the direction of the Y axis. The arrangement direction of the lid and the body of the container of a power storage device, the arrangement direction of the power storage devices, a bus bar holding component, and bus bars, or the vertical direction is defined as the direction of the Z axis. These directions of the X axis, the Y axis, and the Z axis intersect one another (in the present embodiment, they are orthogonal to one another). Depending on the usage mode, the direction of the Z axis may not be the vertical direction, but for convenience of explanation, the direction of the Z axis is hereinafter exemplified as the vertical direction. In the following description, the positive direction of the X axis refers to the direction of the arrow of the X axis, and the negative direction of the X axis refers to the direction opposite the positive direction of the X axis. The same applies to the directions of the Y axis and the Z axis. Hereinafter, the direction of the Y axis may be also referred to as the first direction, and the direction of the X axis may be also referred to as the second direction.

EMBODIMENT

1 General Description of Power Storage Apparatus 10

Figure 2:
FIG. 2 is an exploded perspective view illustrating structural elements of the power storage apparatus according to embodiment.

First, a configuration of a power storage apparatus 10 will be described. FIG. 1 is a perspective view illustrating an external appearance of the power storage apparatus 10 according to the present embodiment. FIG. 2 is an exploded perspective view illustrating structural elements of the power storage apparatus 10 according to the present embodiment.

The power storage apparatus 10 is an apparatus capable of charging electricity from an external source and discharging electricity to an external device. The power storage apparatus 10 is a battery module (assembled battery) used to store power or used as a power source, for example. Specifically, the power storage apparatus 10 is used as, for example, a battery for driving or starting the engine of a moving body such as automobiles e.g., electric vehicles (EVs), hybrid electric vehicles (HEVs), and plug-in hybrid electric vehicles (PHEVs), motorcycles, watercrafts, snowmobiles, agricultural machinery, construction machinery, or railroad vehicles for electric railways e.g., trains, monorails or magnetic levitation trains, or as a stationary battery used for households or generators.

As illustrated in FIG. 1 and FIG. 2, the power storage apparatus 10 includes power storage devices 100, spacers 200, a pair of end components 300, a pair of side components 400, a bus bar holding component 500, bus bars 600, and a board 700.

Each power storage device 100 is a secondary battery (cell battery) capable of charging electricity and discharging electricity, and is, more specifically, a non-aqueous electrolyte secondary battery such as a lithium-ion secondary battery. The power storage device 100 has a flat rectangular parallelepiped (angular) shape, and is disposed adjacent to a spacer 200. That is to say, the power storage devices 100 and the spacers 200 are alternately disposed, and are arranged in the direction of the Y axis (the first direction). In the present embodiment, 13 spacers 200 are disposed in positions interposing 12 power storage devices 100.

The number of power storage devices 100 is not limited to 12, and may be other than 12. The shape of the power storage devices 100 is not particularly limited, and may be any shape such as a circular cylinder, an elliptic cylinder, an oval cylinder, or a polygonal column other than a rectangular parallelepiped. Furthermore, the power storage devices 100 may be pouch-type power storage devices. The power storage devices 100 are not limited to non-aqueous electrolyte secondary batteries. The power storage devices 100 may be secondary batteries other than non-aqueous electrolyte secondary batteries, and may be capacitors. The power storage devices 100 need not be secondary batteries, and may be primary batteries which allow the user to use stored electricity without charging. The power storage devices 100 may be batteries for which a solid electrolyte is used. A detailed description of the configuration of the power storage devices 100 will be provided later.

The spacers 200 are rectangular and plate-shaped spacers that are disposed on lateral sides of the power storage devices 100 (the positive direction or the negative direction of the Y axis) and that insulate the power storage devices 100 from other components. Specifically, the spacers 200 are disposed between two adjacent power storage devices 100 and between the power storage devices 100 located at the ends and the end components 300, and achieve insulation between the two adjacent power storage devices 100 and between the power storage devices 100 located at the ends and the end components 300. In the present embodiment, 13 spacers 200 are disposed to correspond to 12 power storage devices 100, but when the number of power storage devices 100 is changed to a number other than 12, the number of spacers 200 is also changed according to the number of power storage devices 100.

The spacers 200 are formed to cover the long side surfaces (long side surface portions 121 which will be described later) of the power storage devices 100 and also cover approximate halves of the short side surfaces (short side surface portions 122 which will be described later) of the power storage devices 100 on the front side or the rear side (the negative side of the Y axis or the positive side of the Y axis). That is to say, spacers 200 each have a recessed portion in both the front side surface and the rear side surface (both surfaces in the direction of the Y axis), and approximate halves of the power storage devices 100 are inserted into the recessed portions. With such a configuration, two spacers 200 interposing a power storage device 100 cover the short side surfaces of the power storage device 100, thereby ensuring insulation between the power storage device 100 and the side components 400.

The spacers 200 are formed using, for example, an insulating resin material such as polycarbonate (PC), polypropylene (PP), polyethylene (PE), polyphenylenesulfide (PPS) resin, polyphenyleneether (PPE (including modified-PPE)), polyethylene terephthalate (PET), polyetheretherketone (PEEK), tetrafluoroethylene-perfluoroalkylvinylether (PFA), polytetrafluoroethylene (PTFE), polybutylene terephthalate (PBT), polyethersulfone (PES), ABS resin, or a composite material thereof. The spacers 200 may be formed using a material other than resin so long as the material has insulating properties. The spacers 200 may be formed using, for example, ceramic or a mica plate formed by accumulating and combining mica flakes. Not all the spacers 200 need to be formed using the same material.

The end components 300 and the side components 400 are components that press the power storage devices 100 from the outside in the arrangement direction of the power storage devices 100 (the direction of the Y axis, the first direction). That is to say, the end components 300 and the side components 400 interpose the power storage devices 100 from both sides in the arrangement direction of the power storage devices 100, thereby pressing each power storage device 100 included in the power storage devices 100 from both sides in the arrangement direction of the power storage devices 100.

Specifically, the end components 300 are flat block-shaped end plates (holding components) that are arranged on both sides of the power storage devices 100 in the direction of the Y axis, and that interpose and hold the power storage devices 100 from both sides in the arrangement direction of the power storage devices 100 (the direction of the Y axis). The end components 300 are formed using, for example, a metallic (electrically conductive) material such as aluminum, an aluminum alloy, stainless steel, iron, or plated steel sheet from the viewpoint of securing strength, for example. The material of the end components 300 is not particularly limited. For example, the end components 300 may be formed using a high-strength insulating material or may undergo insulating treatment. The end components 300 may be, for example, plate-shaped end plates rather than block-shaped end plates.

Of the paired end components 300, the end component 300 located on the negative side of the Y axis is also referred to as a first end component 301, and the end component 300 located on the positive side of the Y axis is also referred to as a second end component 302. A detailed description of the configuration of the pair of end components 300 (the first end component 301 and the second end component 302) will be provided later.

The side components 400 are elongated flat side plates (binding components, binding bars) that have both ends attached to the end components 300 and bind the power storage devices 100. That is to say, the side components 400 are arranged extending in the direction of the Y axis across the power storage devices 100 and the spacers 200, and apply a binding force to the power storage devices 100 and the spacers 200 in the arrangement direction of the power storage devices 100 and the spacers 200 (the direction of the Y axis). In the present embodiment, a pair of side components 400 are disposed on both sides of the power storage devices 100 and the spacers 200 in the direction of the X axis. Both end portions of each of the paired side components 400 in the direction of the Y axis are attached to the end portions of the paired end components 300 in the direction of the X axis. As a result, the pair of side components 400 interpose and bind the power storage devices 100 and the spacers 200 from both sides in the direction of the X axis and both sides in the direction of the Y axis.

The side components 400 are joined to the end components 300 using joining components 400a arranged in the direction of the Z axis. In the present embodiment, the joining components 400a are bolts penetrating through the side components 400 and fastened to the end components 300. As with the end components 300, the side components 400 are formed using a metallic (electrically conductive) material such as aluminum, an aluminum alloy, stainless steel, iron, or plated steel sheet from the viewpoint of securing strength, for example. The side components 400, however, may be formed using a high-strength insulating material or may undergo insulating treatment. The side components 400 may be, for example, block-shaped or bar-shaped components, rather than plate-shaped side plates.

Of the paired side components 400, the side component 400 located on the positive side of the X axis is also referred to as a first side component 401, and the side component 400 located on the negative side of the X axis is also referred to as a second side component 402. A detailed description of the configuration of the pair of side components 400 (the first side component 401 and the second side component 402) will be provided later.

The bus bar holding component 500 is a plate-shaped component (a bus bar plate, a bus bar frame) that holds the bus bars 600, the board 700, and so on, and is capable of insulating the bus bars 600 and so on from other components and restricting the positions of the bus bars 600 and so on. The bus bar holding component 500 is formed using, for example, an insulating resin material which can be used for the spacers 200, such as PC, PP, or PE.

The bus bars 600 are electrically-conductive, plate-shaped components that are arranged on the power storage devices 100 and that electrically connect electrode terminals (electrode terminals 140 which will be described later) of the power storage devices 100. In the present embodiment, the bus bars 600 connect the power storage devices 100 in series by sequentially connecting the positive terminals and the negative terminals of adjacent power storage devices 100. Bus bars 600 disposed at the ends are connected with external terminals 610 (a positive external terminal, a negative external terminal) that are terminals of the power storage apparatus 10. The bus bars 600 are formed using, for example, a metallic, electrically-conductive component such as copper, a copper alloy, aluminum, or an aluminum alloy. The connection of the power storage devices 100 is not particularly limited, and some of the power storage devices 100 may be connected in parallel.

The board 700 is a circuit board placed on the bus bar holding component 500. Electronic components for monitoring the charging state or discharging state of the power storage devices 100, a fuse, a relay, a shunt resistor, a connector, and so on are disposed on the board 700. Wires 710 are connected to the board 700 via a connector. The wires 710 include, for example, a wire for measuring the voltage of the power storage devices 100 and a wire for measuring the temperature.

2 Description of Power Storage Devices 100

Figure 3:
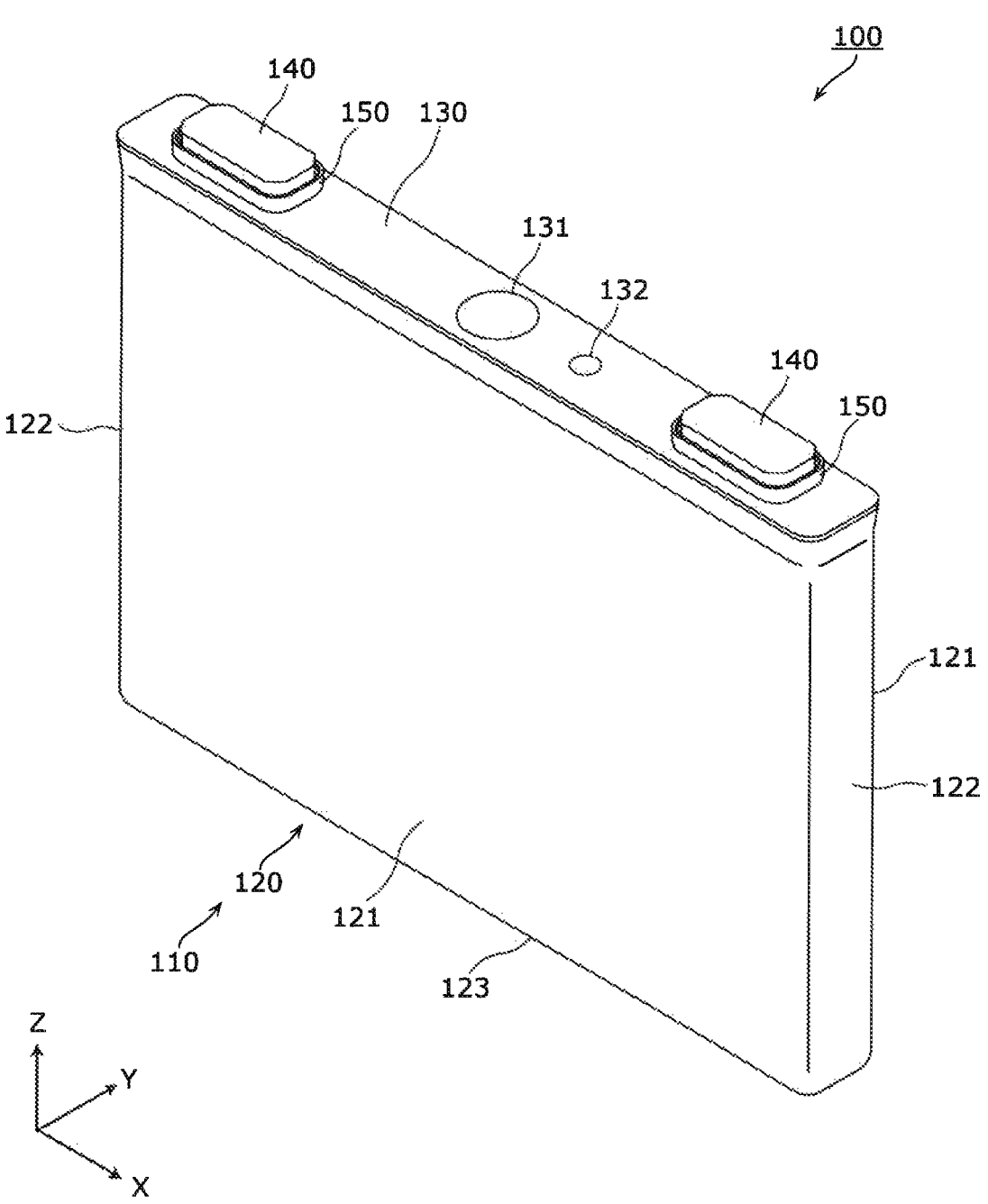
FIG. 3 is a perspective view illustrating a configuration of a power storage device according to the embodiment.

Next, a configuration of the power storage devices 100 will be described in detail. FIG. 3 is a perspective view illustrating a configuration of a power storage device 100 according to the present embodiment.

As illustrated in FIG. 3, the power storage device 100 includes a container 110, a pair of electrode terminals 140 (a positive terminal and a negative terminal), and a pair of gaskets 150. An electrode body, current collectors (a positive current collector and a negative current collector), an electrolytic solution (non-aqueous electrolyte), and so on are housed inside the container 110, but are not illustrated in the drawings. The type of the electrolytic solution is not particularly limited so long as it does not impair the performance of the power storage device 100, and various types can be selected. A spacer may be disposed on, for example, a lateral side of a current collector, or an insulating sheet covering the outer surface of the container 110 may be disposed.

The container 110 is a rectangular parallelepiped (angular) container having a container body 120 in which an opening is formed and a lid body 130 that closes the opening of the container body 120. The container body 120 is a rectangular tubular component having a bottom and forms the main body of the container 110. The container body 120 has a pair of long side surface portions 121 as both side surfaces in the direction of the Y axis, a pair of short side surface portions 122 as both side surfaces in the direction of the X axis, and a bottom surface portion 123 on the negative side of the Z axis. The short side surface portions 122 are rectangular flat surfaces that are adjacent to the pair of long side surface portions 121 and the bottom surface portion 123 and are smaller than the long side surface portions 121 in area size. The bottom surface portion 123 is a rectangular flat surface adjacent to the pair of long side surface portions 121 and the pair of short side surface portions 122. The long side surface portions 121 are rectangular flat surfaces that are adjacent to the pair of short side surface portions 122 and the bottom surface portion 123 and are larger than the short side surface portions 122 in area size. The lid body 130 is a rectangular plate-shaped component that forms the lid portion of the container 110, and is disposed on the container body 120 on the positive side of the Z axis. The lid body 130 has, for example, a gas discharge valve 131 that releases pressure inside the container 110 when the pressure inside the container 110 rises, and a liquid injection portion 132 for injecting the electrolytic solution into the container 110.

With such a configuration, the inside of the container 110 is sealed by joining the container body 120 and the lid body 130 by welding or the like after housing the electrode body and so on inside the container body 120. The material of the container 110 (the container body 120 and the lid body 130) is not particularly limited, but is preferably a weldable (joinable) metal, for example, stainless steel, aluminum, an aluminum alloy, iron, or plated steel sheet.

The electrode terminals 140 are terminals (the positive terminal and the negative terminal) of the power storage device 100 that are disposed on the lid body 130 of the container 110, and are electrically connected to the positive plate and the negative plate of the electrode body via the current collectors. That is to say, the electrode terminals 140 are metallic components for deriving electricity stored in the electrode body to the space outside the power storage device 100 and introducing electricity into the space inside the power storage device 100 to store electricity in the electrode body. The electrode terminals 140 are formed using, for example, aluminum, an aluminum alloy, copper, or a copper alloy.

The gaskets 150 are components disposed between the electrode terminals 140 and the lid body 130 and between the lid body 130 and the current collectors to ensure insulation and air tightness between the electrode terminals 140 and the lid body 130 and between the lid body 130 and the current collectors. The gaskets 150 are formed using an insulating material such as PP, PE, PPS, PET, PEEK, PEA, PTFE, PBT, PES, or ABS resin.

The electrode body is a power storage element (a power generation element) formed by laminating a positive plate, a negative plate, and a separator. The positive plate of the electrode body is configured by forming a positive active material layer on a positive base material layer, which is a long strip-shaped current collecting foil formed from metal such as aluminum or an aluminum alloy. The negative plate is configured by forming a negative active material layer on a negative base material layer, which is a long strip-shaped current collecting foil formed from metal such as copper or a copper alloy. Known materials can be used as appropriate for the positive active material used for the positive active material layer and the negative active material used for the negative active material layer, so long as they can absorb and release lithium ions. The current collectors are components (the positive current collector and the negative current collector) having electrical conductivity and rigidity and are electrically connected to the electrode terminals 140 and the electrode body. As with the positive base material layer of the positive plate, the positive current collector is formed using, for example, aluminum or an aluminum alloy, and as with the negative base material layer of the negative plate, the negative current collector is formed using, for example, copper or a copper alloy.

3 Description of End Components 300 and Side Components 400

[3.1 Description of End Components 300]

Figure 4:
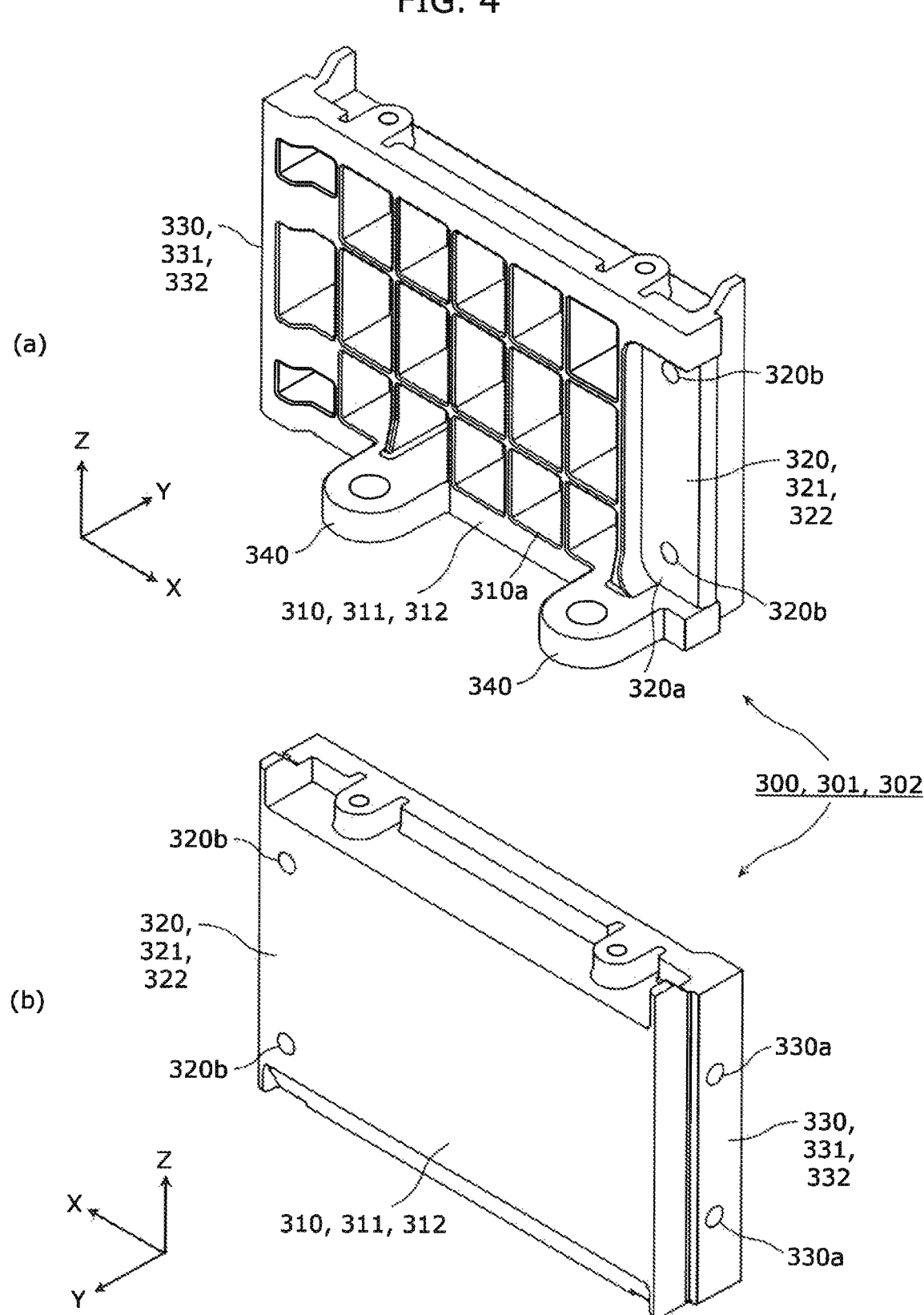
FIG. 4 shows perspective views illustrating a configuration of end components (a first end component and a second end component) according to the embodiment.

Next, configurations of the end components 300 and the side components 400 will be described in detail. First, a configuration of the end components 300 (the first end component 301 and the second end component 302) will be described in detail. FIG. 4 shows perspective views illustrating a configuration of the end components 300 (the first end component 301 and the second end component 302)

according to the present embodiment. Specifically, part (a) of FIG. 4 is a perspective view illustrating a configuration of the first end component 301 in FIG. 2 or a configuration of the second end component 302 rotated by 180 degrees around the Z axis. Part (b) of FIG. 4 is a perspective view illustrating a configuration of the end component 300 shown in part (a) of FIG. 4 viewed from the opposite side in the direction of the Y axis. Since the first end component 301 and the second end component 302 have the same configuration when rotated by 180 degrees around the Z axis, they are illustrated in the same drawing.

As illustrated in FIG. 4, the end component 300 includes an end main body 310, an end connector 320, an end connector 330, and two fixing portions 340.

The end main body 310 is a rectangular, block-shaped portion that forms the main body of the end component 300. In the present embodiment, the shape of the end main body 310 is that it has a rectangular parallelepiped portion that is long in the direction of the X axis and thin in the direction of the Y axis, and that the rectangular parallelepiped portion has rectangular recessed portions 310a recessed into the positive direction of the Y axis. The shape of the end main body 310, however, is not particularly limited. That is to say, the end main body 310 may have any number of recessed portions 310a in any shape, or may have no recessed portions 310a. The fixing portions 340 are portions of the end main body 310 that protrude in the negative direction of the Y axis from the end portion of the end main body 310 on the negative side of the Z axis, and are fixed to another component such as a vehicle body to fix the power storage apparatus 10 to the other component.

The end connector 320 is an end portion of the end component 300 on the positive side of the X axis and is disposed on the end main body 310 on the positive side of the X axis to extend in the direction of the Z axis. Specifically, the end connector 320 has a recessed portion 320a in which a portion of the end connector 320 on the negative side of the Y axis is recessed into the positive direction of the Y axis. The recessed portion 320a is a recessed portion that extends in the direction of the Z axis and is open on the negative side of the Y axis and the positive side of the X axis. Two circular hole portions 320b arranged in the direction of the Z axis are formed in a wall of the recessed portion 320a that is on the positive side of the Y axis and is parallel to the XZ plane. Each hole portion 320b is a through hole in which a female threaded portion is formed to be threadedly engaged with a male threaded portion of the joining component 400a.

The end connector 330 is an end portion of the end component 300 on the negative side of the X axis and is disposed on the end main body 310 on the negative side of the X axis to extend in the direction of the Z axis. Specifically, the end connector 330 is a side wall of the end component 300 on the negative side of the X axis. Two circular hole portions 330a arranged in the direction of the Z axis are formed in the side wall. Each hole portion 330a is a recessed portion in which a female threaded portion is formed to be threadedly engaged with a male threaded portion of the joining component 400a.

The end main body 310 of the first end component 301 is also referred to as a first end main body 311. The end connector 320 of the first end component 301 is also referred to as a first end connector 321. The end connector 330 of the first end component 301 is also referred to as a second end connector 331. The end main body 310 of the second end component 302 is also referred to as a second end main body 312. The end connector 320 of the second end component 302 is also referred to as a third end connector 322.

The end connector 330 of the second end component 302 is also referred to as a fourth end connector 332. That is to say, the first end component 301 includes the first end main body 311, the first end connector 321, and the second end connector 331. The second end component 302 includes the second end main body 312, the third end connector 322, and the fourth end connector 332.

[3.2 Description of Side Components 400]

Figure 5:
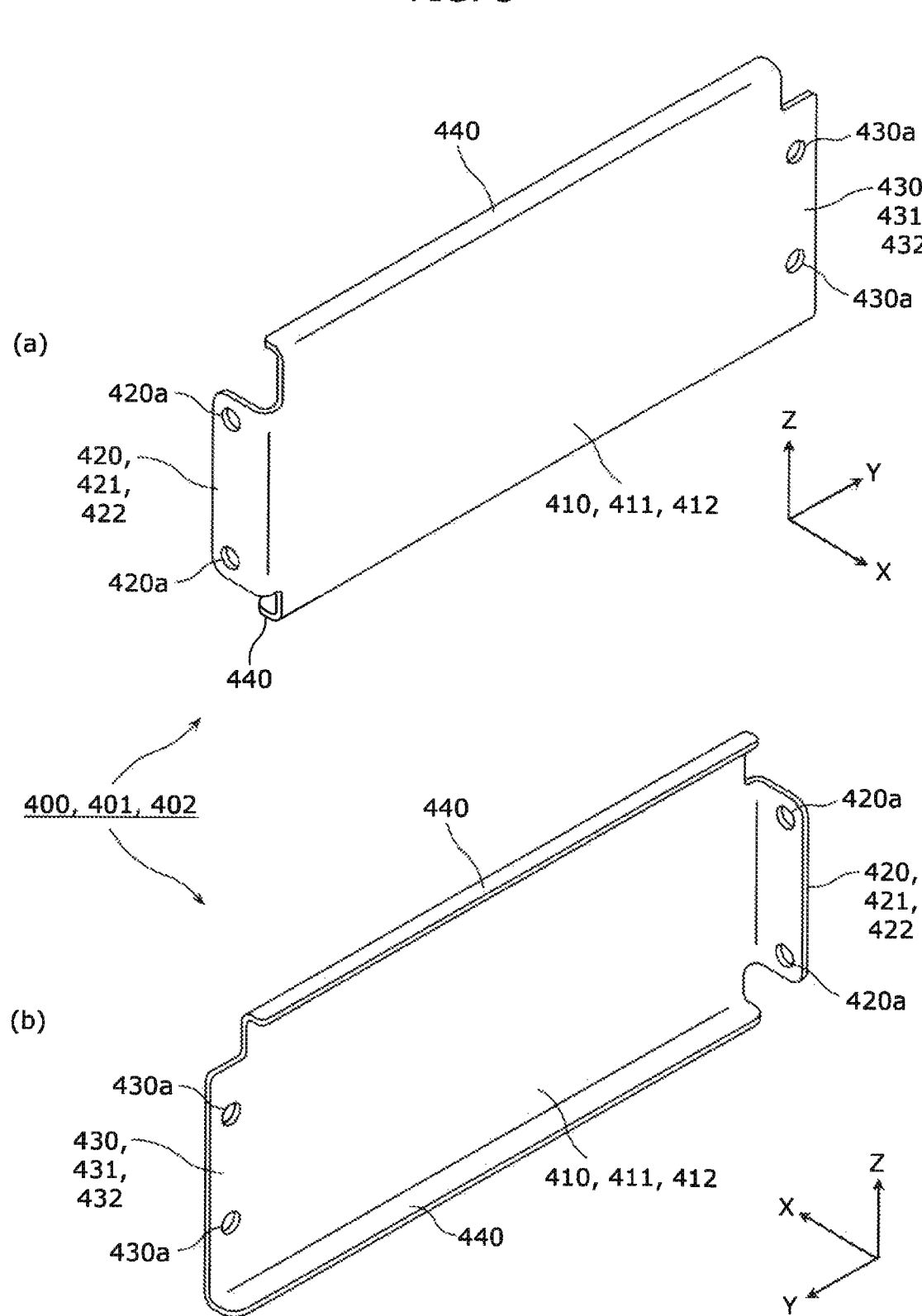
FIG. 5 shows perspective views illustrating a configuration of side components (a first side component and a second side component) according to the embodiment.

Next, a configuration of the side components 400 (the first side component 401 and the second side component 402) will be described in detail. FIG. 5 shows perspective views illustrating a configuration of the side components 400 (the first side component 401 and the second side component 402) according to the present embodiment. Specifically, part (a) of FIG. 5 is a perspective view illustrating a configuration of the first side component 401 in FIG. 2 or a configuration of the second side component 402 rotated by 180 degrees around the Z axis. Part (b) of FIG. 5 is a perspective view illustrating a configuration of the side component 400 shown in part (a) of FIG. 5 viewed from the opposite side in the direction of the X axis. Since the first side component 401 and the second side component 402 have the same configuration when rotated by 180 degrees around the Z axis, they are illustrated in the same drawing.

As illustrated in FIG. 5, the side component 400 includes a side main body 410, side connectors 420 and 430, and a pair of protrusions 440.

The side main body 410 is a rectangular flat plate portion that forms the main body of the side component 400. Specifically, the side main body 410 is disposed in parallel to the YZ plane and extends in the direction of the Y axis. The pair of protrusions 440 are portions of the side main body 410 that protrude in the negative direction of the X axis from the end portions of the side main body 410 on the positive side and the negative side of the Z axis. The pair of protrusions 440 extend in the direction of the Y axis. With this configuration, the pair of protrusions 440 are disposed in positions interposing the spacers 200 in the direction of the Z axis, and restrict movement of the power storage devices 100 and the spacers 200 in the direction of the Z axis.

The side connector 420 is an end portion of the side component 400 on the negative side of the Y axis, and protrudes in the negative direction of the X axis from an edge of the side main body 410 on the negative side of the Y axis. Specifically, the side connector 420 is a rectangular flat plate portion that is disposed in parallel to the XZ plane and extends in the direction of the Z axis. The side connector 420 has two circular through holes 420a that are arranged in the direction of the Z axis and penetrate through the side connector 420 in the direction of the Y axis.

The side connector 430 is an end portion of the side component 400 on the positive side of the Y axis, and extends in the positive direction of the Y axis from an edge of the side main body 410 on the positive side of the Y axis. That is to say, the side connector 430 is a rectangular flat plate portion that is parallel to the YZ plane and extends in the direction of the Z axis, and is provided to extend continuously from the side main body 410 on the positive side of the Y axis. The side connector 430 has two circular through holes 430a that are arranged in the direction of the Z axis and penetrate through the side connector 430 in the direction of the X axis.

The side main body 410 of the first side component 401 is also referred to as a first side main body 411. The side connector 420 of the first side component 401 is also referred to as a first side connector 421. The side connector 430 of the first side component 401 is also referred to as a fourth side connector 431. The side main body 410 of the second side component 402 is also referred to as a second side main body 412. The side connector 420 of the second side component 402 is also referred to as a third side connector 422. The side connector 430 of the second side component 402 is also referred to as a second side connector 432. That is to say, the first side component 401 includes the first side main body 411, the first side connector 421, and the fourth side connector 431. The second side component 402 includes the second side main body 412, the third side connector 422, and the second side connector 432.

[3.3 Description of Configuration in which End Components 300 and Side Components 400 are Connected]

Figure 6:
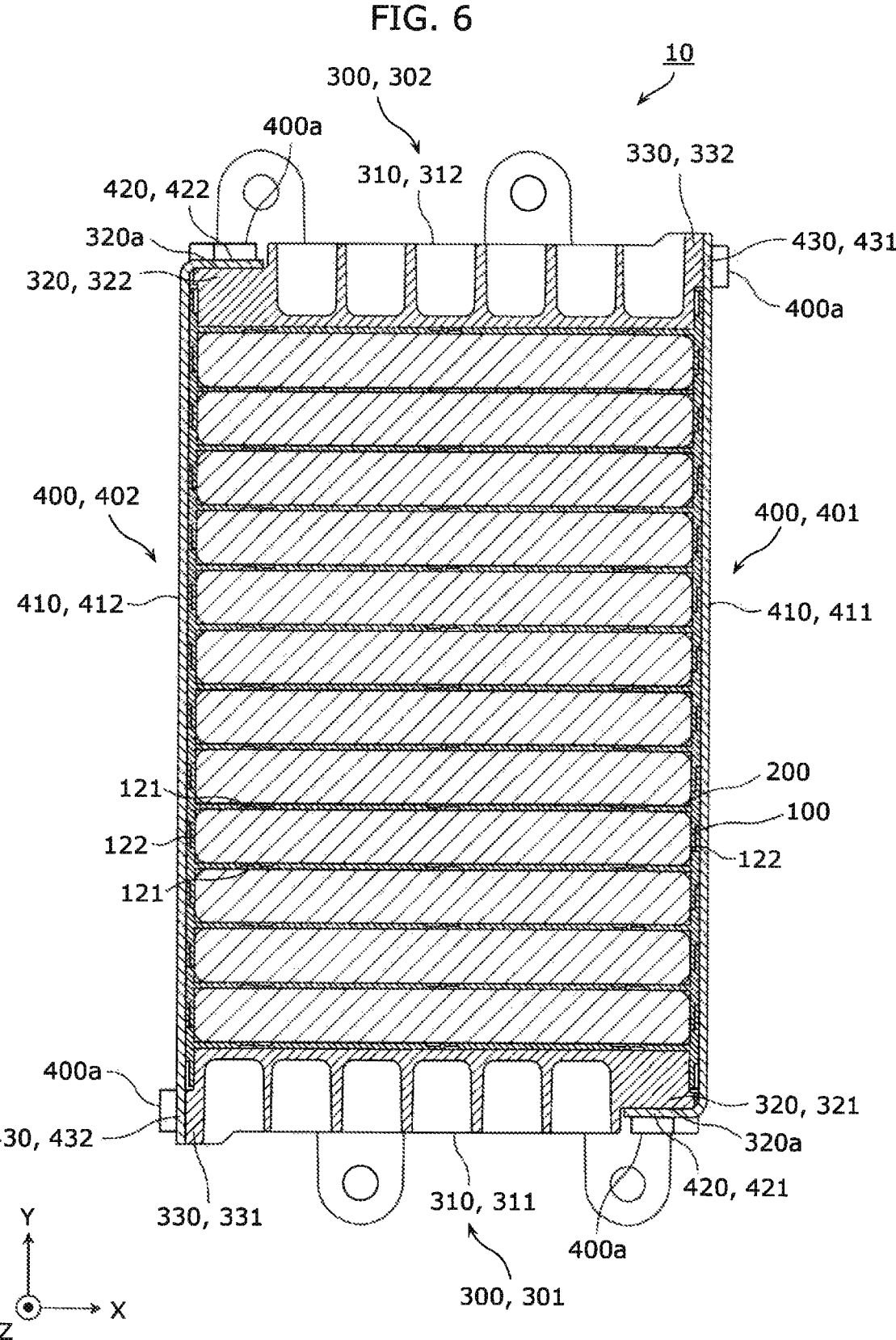
FIG. 6 is a cross-sectional view illustrating a configuration in which the end components (the first end component and the second end component) and the side components (the first side component and the second side component) according to the embodiment are connected.

Next, a configuration in which the end components 300 and the side components 400 are connected will be described in detail. FIG. 6 is a cross-sectional view illustrating a configuration in which the end components 300 (the first end component 301 and the second end component 302) and the side components 400 (the first side component 401 and the second side component 402) according to the present embodiment are connected. Specifically, FIG. 6 is a cross-sectional view illustrating a configuration of the power storage apparatus 10 in FIG. 1 cut along a plane parallel to the XY plane passing through the VI-VI line, and illustrates a configuration in which the power storage devices 100, the spacers 200, the end components 300, and the side components 400 are assembled.

As illustrated in FIG. 6, the first end component 301 and the second end component 302 are disposed in positions interposing the power storage devices 100 in the direction of the Y axis (the first direction). That is to say, the first end component 301 and the second end component 302 are disposed in positions interposing the pairs of long side surface portions 121 of the containers 110 of the power storage devices 100. In the present embodiment, the first end component 301 is disposed on the negative side of the Y axis with respect to the power storage devices 100, and the second end component 302 is disposed on the positive side of the Y axis with respect to the power storage devices 100.

The first side component 401 and the second side component 402 are disposed in positions interposing the power storage devices 100 in the direction of the X axis (the second direction intersecting the first direction). That is to say, the first side component 401 and the second side component 402 are disposed in positions interposing the pairs of short side surface portions 122 of the containers 110 of the power storage devices 100. In the present embodiment, the first side component 401 is disposed on the positive side of the X axis with respect to the power storage devices 100, and the second side component 402 is disposed on the negative side of the X axis with respect to the power storage devices 100.

In such a configuration, the first end connector 321 of the first end component 301 is connected to the first side component 401. Specifically, the first end connector 321 is connected to the first side connector 421 of the first side component 401. More specifically, the first end connector 321 and the first side connector 421 overlap one another in the direction of the Y axis (the first direction), and are joined. That is to say, the first side connector 421 is disposed on the negative side of the Y axis with respect to the first end connector 321 to overlap with and be joined to the first end connector 321.

In the present embodiment, the first end connector 321 includes a recessed portion 320a recessed in the direction of the Y axis (the first direction), and the first side connector 421 is disposed in the recessed portion 320*a* and is joined to the first end connector 321. Specifically, the joining components 400*a* are inserted into the through holes 420*a* of the first side connector 421 and are threadedly engaged with the hole portions 320*b* of the first end connector 321 to join (fix) the first end connector 321 and the first side connector 421. As a result, the first side connector 421 is disposed at a position where the first side connector 421 does not protrude in the negative direction of the Y axis from a surface of the first end main body 311 of the first end component 301 on the negative side of the Y axis. In the present embodiment, the joining components 400*a* are also disposed at positions where the joining components 400*a* do not protrude in the negative direction of the Y axis from the surface of the first end main body 311 on the negative side of the Y axis.

The second end connector 331 of the first end component 301 is connected to the second side component 402. Specifically, the second end connector 331 is connected to the second side connector 432 of the second side component 402. More specifically, the second end connector 331 and the second side connector 432 overlap in the direction of the X axis (the second direction), and are joined. That is to say, the second side connector 432 is disposed on the negative side of the X axis with respect to the second end connector 331 to overlap with and be joined to the second end connector 331.

In the present embodiment, the second end connector 331 is a side wall of the first end component 301 in the direction of the X axis (the second direction), and the second side connector 432 overlaps the side wall (the second end connector 331) in the direction of the X axis (the second direction), and is joined to the side wall. Specifically, the joining components 400*a* are inserted into the through holes 430*a* of the second side connector 432 and are threadedly engaged with the hole portions 330*a* of the second end connector 331 to join (fix) the second end connector 331 and the second side connector 432. As a result, the second side connector 432 is disposed at a position where the second side connector 432 does not protrude in the negative direction of the Y axis from a surface of the second end connector 331 on the negative side of the Y axis.

The third end connector 322 of the second end component 302 is connected to the second side component 402. Specifically, the third end connector 322 is connected to the third side connector 422 of the second side component 402. More specifically, the third end connector 322 and the third side connector 422 overlap in the direction of the Y axis (the first direction), and are joined. That is to say, the third side connector 422 is disposed on the positive side of the Y axis with respect to the third end connector 322 to overlap with and be joined to the third end connector 322.

In the present embodiment, the third end connector 322 includes a recessed portion 320*a* recessed in the direction of the Y axis (the first direction), and the third side connector 422 is disposed in the recessed portion 320*a* and is joined to the third end connector 322. Specifically, the joining components 400*a* are inserted into the through holes 420*a* of the third side connector 422 and are threadedly engaged with the hole portions 320*b* of the third end connector 322 to join (fix) the third end connector 322 and the third side connector 422. As a result, the third side connector 422 is disposed at a position where the third side connector 422 does not protrude in the positive direction of the Y axis from a surface of the second end main body 312 of the second end component 302 on the positive side of the Y axis. In the present embodiment, the joining components 400*a* are also disposed at positions where the joining components 400*a* do not protrude in the positive direction of the Y axis from the surface of the second end main body 312 on the positive side of the Y axis.

The fourth end connector 332 of the second end component 302 is connected to the first side component 401. Specifically, the fourth end connector 332 is connected to the fourth side connector 431 of the first side component 401. More specifically, the fourth end connector 332 and the fourth side connector 431 overlap in the direction of the X axis (the second direction), and are joined. That is to say, the fourth side connector 431 is disposed on the positive side of the X axis with respect to the fourth end connector 332 to overlap with and be joined to the fourth end connector 332.

In the present embodiment, the fourth end connector 332 is a side wall of the second end component 302 in the direction of the X axis (the second direction), and the fourth side connector 431 overlaps the side wall (the fourth end connector 332) in the direction of the X axis (the second direction), and is joined to the side wall. Specifically, the joining components 400*a* are inserted into the through holes 430*a* of the fourth side connector 431 and are threadedly engaged with the hole portions 330*a* of the fourth end connector 332 to join (fix) the fourth end connector 332 and the fourth side connector 431. As a result, the fourth side connector 431 is disposed at a position where the fourth side connector 431 does not protrude in the positive direction of the Y axis from a surface of the fourth end connector 332 on the positive side of the Y axis.

4 Description of Advantageous Effects

As described above, in the power storage apparatus 10 according to the present embodiment, the first end connector 321 of the first end component 301 and the first side connector 421 of the first side component 401 overlap one another in the first direction (the direction of the Y axis), and are joined. The second end connector 331 of the first end component 301 and the second side connector 432 of the second side component 402 overlap one another in the second direction (the direction of the X axis), and are joined. By joining the first end component 301 and the first side component 401 in the first direction and joining the first end component 301 and the second side component 402 in the second direction in the above-described manner, the first end component 301 is joined in different directions, i.e., the first direction and the second direction. Accordingly, since it is possible to inhibit concentration of the binding force at both end portions of the power storage devices 100 on the side-component-400 sides while binding the power storage devices 100 in the first direction, unbalance in the binding force applied to the power storage devices 100 can be inhibited.

The third end connector 322 of the second end component 302 and the third side connector 422 of the second side component 402 overlap one another in the first direction, and are joined. By joining the second end component 302 and the second side component 402 in the first direction in the above-described manner, the second side component 402 joined to the first end component 301 in the second direction can be joined to the second end component 302 in the first direction. Accordingly, it is possible to inhibit unbalance of the binding force applied to the power storage devices 100 while increasing the binding force applied to the power storage devices 100 in the first direction.

If both end portions of the second side component 402 are joined to the two end components 300 in the first direction, it may be difficult to absorb the tolerance in the first direction. Therefore, by joining the second side component 402 to the first end component 301 in the second direction, the tolerance in the first direction can be easily absorbed.

The fourth end connector 332 of the second end component 302 and the fourth side connector 431 of the first side component 401 overlap one another in the second direction, and are joined. By joining the second end component 302 and the first side component 401 in the second direction in the above-described manner, both of the two end components 300 are joined to the two side components 400 in different directions, i.e., the first direction and the second direction, and both of the two side components 400 are joined to the two end components 300 in the different directions. Accordingly, the power storage devices 100 can be bound in a well-balanced manner by the two end components 300 and the two side components 400, and thus, it is possible to inhibit unbalance of the binding force applied to the power storage devices 100.

Since the two end components 300 can both be formed in the same shape and the two side components 400 can both be formed in the same shape, the two end components 300 can have commonality of components and the two side components 400 can have commonality of components.

The first side connector 421 of the first side component 401 is disposed in the recessed portion 320a that belongs to the first end connector 321 of the first end component 301 and is recessed in the first direction, and the first side connector 421 is joined to the first end connector 321. By disposing at least part of the first side connector 421 in the recessed portion 320a of the first end connector 321 in the above-described manner when joining the first side connector 421 to the first end connector 321, it is possible to inhibit the first side connector 421 from protruding from the first end connector 321 in the first direction. Accordingly, since it is possible to inhibit the first side component 401 from protruding from the first end component 301 in the first direction, unbalance of the binding force applied to the power storage devices 100 can be inhibited while saving space. The same applies to the third end connector 322 of the second end component 302 and the third side connector 422 of the second side component 402.

The second side connector 432 of the second side component 402 overlaps the side wall of the first end component 301 in the second direction, i.e., overlaps the second end connector 331 in the second direction, and is joined to the side wall. Since the second side connector 432 overlaps the side wall of the first end component 301 in the second direction and is joined to the side wall in the above-described manner, it is possible to inhibit the second side connector 432 from protruding from the first end component 301 in the first direction. Accordingly, since it is possible to inhibit the second side component 402 from protruding from the first end component 301 in the first direction, unbalance of the binding force applied to the power storage devices 100 can be inhibited while saving space. The same applies to the fourth end connector 332 of the second end component 302 and the fourth side connector 431 of the first side component 401.

5 Description of Variations

Although the power storage apparatus 10 according to an embodiment of the present disclosure has been described above, the present disclosure is not limited to this embodiment. That is to say, the embodiment disclosed herein is exemplary and non-limiting in all aspects, and the scope of the present disclosure includes all modifications within the meaning and the scope equivalent to the claims.

In the above embodiment, the third end connector 322 of the second end component 302 and the third side connector 422 of the second side component 402 overlap one another in the first direction, and are joined. The third end connector 322 and the third side connector 422, however, may overlap one another in the second direction and be joined.

In the above embodiment, the fourth end connector 332 of the second end component 302 and the fourth side connector 431 of the first side component 401 overlap one another in the second direction, and are joined. The fourth end connector 332 and the fourth side connector 431, however, may overlap one another in the first direction and be joined.

In the present embodiment, the first end connector 321 of the first end component 301 includes the recessed portion 320a recessed in the first direction, and the first side connector 421 of the first side component 401 is disposed in the recessed portion 320a and is joined to the first end connector 321. The first end connector 321, however, may include no recessed portion 320a and be joined to the first side connector 421 without the recessed portion 320a. The same applies to the third end connector 322 of the second end component 302 and the third side connector 422 of the second side component 402.

In the above embodiment, the second end connector 331 of the first end component 301 is the side wall of the first end component 301 in the second direction, and the second side connector 432 of the second side component 402 overlaps the side wall in the second direction, and is joined to the side wall. The second end connector 331, however, may be a protrusion protruding from the first end main body 311 in the direction of the Y axis, and the second side connector 432 may overlap the protrusion in the second direction and be joined to the protrusion. The same applies to the fourth end connector 332 of the second end component 302 and the fourth side connector 431 of the first side component 401.

In the above embodiment, the first end component 301 and the second end component 302 have the same shape, and the first side component 401 and the second side component 402 have the same shape. However, the first end component 301 and the second end component 302 may have different shapes, and the first side component 401 and the second side component 402 may have different shapes.

In the above embodiment, the end components 300 and the side components 400 are joined by bolting using the joining components 400a. The joining of the end components 300 and the side components 400, however, is not limited to bolting, and they may be joined by, for example, riveting, swage joining, fitting, engaging, welding, or bonding with an adhesive, a double-sided tape, or the like.

In the above embodiment, the power storage apparatus 10 need not include all the structural elements illustrated in FIG. 2, The power storage apparatus 10 need not include the spacers 200, the bus bar holding component 500, or the board 700.

The scope of the present disclosure also encompasses forms constructed by arbitrarily combining the structural elements included in the above-described embodiment and variations.

The present disclosure can be implemented not only as the power storage apparatus 10 as described above, but also as the end components 300 and the side components 400 included in the power storage apparatus 10.

INDUSTRIAL APPLICABILITY

The present disclosure is applicable to, for example, power storage apparatuses including power storage devices such as lithium-ion secondary batteries.

The invention claimed is:

1. A power storage apparatus comprising:
power storage devices arranged in a first direction;
a first end component and a second end component disposed in positions interposing the power storage devices in the first direction; and
a first side component and a second side component disposed in positions interposing the power storage devices in a second direction intersecting the first direction,
wherein the first end component includes a first end connector connected to the first side component and a second end connector connected to the second side component,
the first side component includes a first side connector connected to the first end connector,
the second side component includes a second side connector connected to the second end connector,
the first end connector and the first side connector overlap one another in the first direction, and are joined in the first direction by a first joining component,
the second end connector and the second side connector overlap one another in the second direction, and are joined in the second direction by a second joining component,
the first joining component is a component separate from the first end component and the first side component,
the second joining component is a component separate from the first end component and the second side component,
the first joining component is a component extending in the first direction,
second joining component is a component extending in the second direction, and
the first end component is joined to the first side component in only the first direction, and the first end component is joined to the second side component in only the second direction.

2. The power storage apparatus according to claim 1,
wherein the second end component includes a third end connector connected to the second side component,
the second side component includes a third side connector connected to the third end connector, and
the third end connector and the third side connector overlap one another in the first direction, and are joined.

3. The power storage apparatus according to claim 2,
wherein the second end component includes a fourth end connector connected to the first side component,
the first side component includes a fourth side connector connected to the fourth end connector, and
the fourth end connector and the fourth side connector overlap one another in the second direction, and are joined.

4. The power storage apparatus according to claim 2,
wherein the first end connector and the third end connector each include a recessed portion recessed in the first direction,
the first side connector is disposed in the recessed portion of the first end connector and is joined to the first end connector,
the third side connector is disposed in the recessed portion of the third end connector and is joined to the third end connector, and
each recessed portion is disposed on only one side in the second direction in an alternating manner with the first end connector and the third end connector.

5. The power storage apparatus according to claim 1,
wherein the first end connector includes a recessed portion recessed in the first direction, and
the first side connector is disposed in the recessed portion and is joined to the first end connector.

6. The power storage apparatus according to claim 1,
wherein the second end connector is a side wall of the first end component in the second direction, and
the second side connector overlaps the side wall in the second direction, and is joined to the side wall.

7. The power storage apparatus according to claim 1,
wherein the first end component includes an end main body and a fixing portion,
wherein the end main body is disposed at an end of the power storage devices in the first direction,
wherein the fixing portion is disposed at an end of the end main body in the vertical direction intersecting with the first direction and the second direction, and
wherein the fixing portion is fixed to another component external to the power storage apparatus.

8. The power storage apparatus according to claim 1,
wherein the first side component includes a first side main body and a first protrusion,
wherein the first side main body is disposed on one side of the power storage devices in the second direction,
wherein the first protrusion protrudes in the second direction from an end of the first side main body in a vertical direction intersecting with the first direction and the second direction,
wherein the second side component includes a second side main body and a second protrusion,
wherein the second side main body is disposed on other side of the power storage devices in the second direction, and
wherein the second protrusion protrudes in the second direction from an end of the second side main body in the vertical direction.

9. The power storage apparatus according to claim 1,
wherein the power storage devices and spacers are alternately disposed, and are arranged in the first direction which is different than the second direction.

10. The power storage apparatus according to claim 1,
wherein the first direction is perpendicular to the second direction.

11. The power storage apparatus according to claim 1,
wherein the first end component and the first side component are joined in the first direction and the first end component and the second side component are joined in the second direction, the first direction being different than the second direction.

12. The power storage apparatus according to claim 1, wherein
the first end connector and the first side connector are not joined in the second direction, and
the second end connector and the second side connector are not joined in the first direction.

13. A power storage apparatus comprising:
power storage devices arranged in a first direction;
a first end component and a second end component disposed in positions interposing the power storage devices in the first direction; and
a first side component and a second side component disposed in positions interposing the power storage devices in a second direction intersecting the first direction, wherein the first end component includes a first end connector connected to the first side component and a second end connector connected to the second side component, the first side component includes a first side connector connected to the first end connector, the second side component includes a second side connector connected to the second end connector, the first end connector and the first side connector overlap one another in the first direction, and are joined in the first direction by a first joining component, the second end connector and the second side connector overlap one another in the second direction, and are joined in the second direction by a second joining component, the first joining component is a component separate from the first end component and the first side component, the second joining component is a component separate from the first end component and the second side component, the first joining component is a component extending in the first direction, and second joining component is a component extending in the second direction, wherein the first end connector includes a recessed portion recessed in the first direction, and the first side connector is disposed in the recessed portion and is joined to the first end connector, wherein the recessed portion is disposed on only one side in the second direction.

14. A power storage apparatus comprising:

power storage devices arranged in a first direction;

a first end component and a second end component disposed in positions interposing the power storage devices in the first direction; and a first side component and a second side component disposed in positions interposing the power storage devices in a second direction intersecting the first direction, wherein the first end component includes a first end connector connected to the first side component and a second end connector connected to the second side component, the first side component includes a first side connector connected to the first end connector, the second side component includes a second side connector connected to the second end connector, the first end connector and the first side connector overlap one another in the first direction, and are joined in the first direction by a first joining component, the second end connector and the second side connector overlap one another in the second direction, and are joined in the second direction by a second joining component, the first joining component is a component separate from the first end component and the first side component, the second joining component is a component separate from the first end component and the second side component, the first end component includes an end main body and a fixing portion, the end main body is disposed at an end of the power storage devices in the first direction, the fixing portion is disposed at an end of the end main body in a vertical direction intersecting with the first direction and the second direction, the fixing portion is fixed to another component external to the power storage apparatus, and the first end component is joined to the first side component in only the first direction, and the first end component is joined to the second side component in only the second direction.

15. The power storage apparatus according to claim 14, wherein the second end connector is a side wall of the first end component in the second direction, and the second side connector overlaps the side wall in the second direction, and is joined to the side wall.

16. The power storage apparatus according to claim 14, wherein the first side component includes a first side main body and a first protrusion, wherein the first side main body is disposed on one side of the power storage devices in the second direction, wherein the first protrusion protrudes in the second direction from an end of the first side main body in a vertical direction intersecting with the first direction and the second direction, wherein the second side component includes a second side main body and a second protrusion, wherein the second side main body is disposed on other side of the power storage devices in the second direction, and wherein the second protrusion protrudes in the second direction from an end of the second side main body in the vertical direction.

17. The power storage apparatus according to claim 14, wherein the first end component and the first side component are joined in the first direction and the first end component and the second side component are joined in the second direction, the first direction being different than the second direction.

18. The power storage apparatus according to claim 14, wherein the other component external to the power storage apparatus comprises a vehicle body.

19. The power storage apparatus according to claim 14, wherein the other component comprises an apparatus powered by the power storage apparatus, and wherein the power storage devices are stacked in the first direction that is different than the second direction.

20. The power storage apparatus according to claim 14, wherein the first end connector and the first side connector are not joined in the second direction, and the second end connector and the second side connector are not joined in the first direction.

* * * * *